Figure 1:
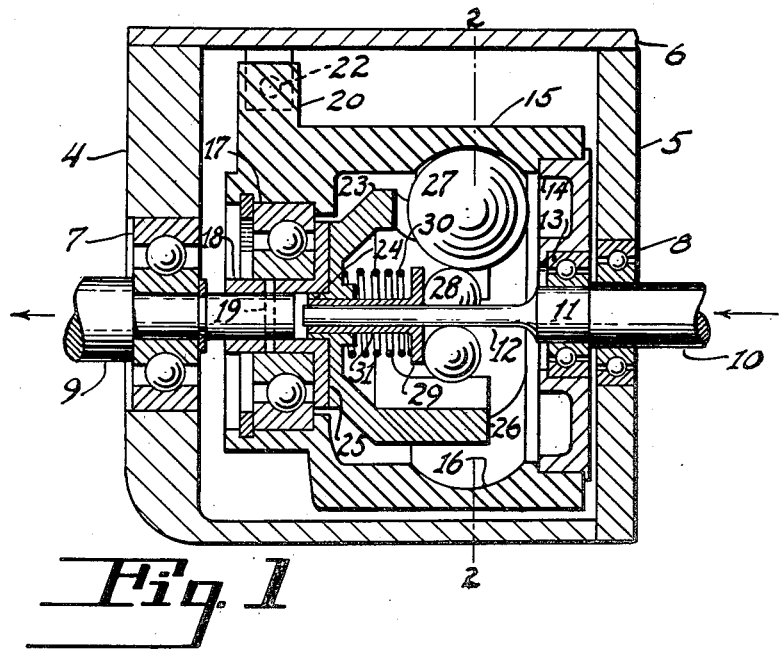

March 15, 1955  E. K. HINE ET AL  2,703,992
DIFFERENTIAL SPEED REDUCER

Filed Sept. 26, 1950  2 Sheets-Sheet 1

INVENTOR.
EDWARD K. HINE
WILLIAM E. BURNS
BY
Godfrey B. Speir
ATTORNEY.

March 15, 1955  E. K. HINE ET AL  2,703,992
DIFFERENTIAL SPEED REDUCER

Filed Sept. 26, 1950  2 Sheets-Sheet 2

INVENTOR
EDWARD K. HINE, WILLIAM E. BURNS
BY
ATTORNEY

United States Patent Office 2,703,992
Patented Mar. 15, 1955

2,703,992

DIFFERENTIAL SPEED REDUCER

Edward K. Hine, North Caldwell, and William E. Burns, Denville, N. J., assignors to Curtiss-Wright Corporation, a corporation of Delaware Application September 26, 1950, Serial No. 186,801

19 Claims. (Cl. 74—798)

This invention relates to speed reducing mechanisms and to mechanisms wherein differential action may be secured between a pair of driven members and a third member. In particular, the invention is concerned with mechanisms of the type incorporating three members rotatable relative to one another wherein two of the elements may be input members and the third an output member or wherein one element may be a reaction member, one an input member and the other an output member.

An object of the invention is to provide a compact and effective differential speed reducer for instrument applications, although the principles of the invention may be applied to larger units capable of transmission of substantial amounts of power. Another object of the invention is to provide a mechanism utilizing ball transmission elements which are enforced to frictional engagement with coacting members for the transmission of power. Another object of the invention is to provide a transmission mechanism capable of adjustment to provide variable drive ratios. Another object of the invention is to provide a ball transmission mechanism including raceways and ball transmission elements, and a loading device to hold the various components of the mechanism in firm engagement to enable power transmission.

Briefly, the invention consists of an outer race member, interiorly engaged by a plurality of balls, a cage member holding the balls in properly spaced relation and comprising one of the drive elements of the mechanism, a spindle coaxial with the outer race and cage members which comprises one of the elements of the transmission, a second set of balls engaging the first balls and also engaging the spindle, and an elastic loading device to hold the several elements in driving relationship.

The mechanism further comprises a friction clutch device to limit the torque output to a value of something less than that which the ball contacts within the transmission are capable of transmitting, to avoid slipping and scuffing at the ball contacts. It is contemplated that the transmission herein covered is best adapted for instrument applications requiring low torque values but the principles of the invention are deemed applicable to transmissions of larger capacity if properly designed for the required duty.

Further objects of the invention, and the detailed character thereof, will be appreciated by viewing the accompanying drawings and by reading the annexed detailed description, these providing a specific but non-limiting example of the mechanism of the invention. In the drawings similar reference characters show similar parts.

Figure 2:
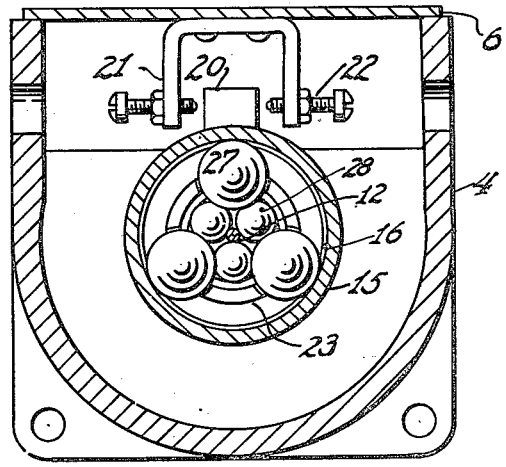
Figure 3:
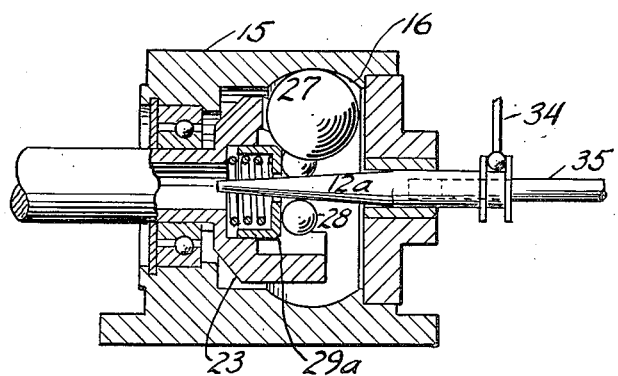

Fig. 1 is a longitudinal section through the mechanism;
Fig. 2 is a section on the line 2—2 of Fig. 1; and
Fig. 3 is a section through an alternative embodiment of the invention.

The transmission comprises a housing 4 including a separable end plate 5 and cover 6, the housing 4 and the plate 5 including bearings 7 and 8 respectively for reception of shafts 9 and 10, either of which may be an input shaft and the other an output shaft. The shaft 10 within the housing includes a journal 11 and a spindle 12 of relatively small diameter. On the journal 11 is a bearing 13 embraced by a disk 14 on the rim of which is secured an annular race 15 including a ball groove 16 whose effective diameter is large relative to the spindle diameter. The ratio of these diameters establishes the drive ratio of the unit. The opposite end of the race 15 includes a bearing 17 piloted on a flanged member 18 pinned as at 19 to a part of the shaft 9 extending into the housing. The race member 15 may include a boss 20 for engagement by screws 21 secured, as reaction members, to a bracket 21 on the mechanism cover 6.

Within the race 15 is a cage 23 piloted in the member 18 at 24 and having a flat face engaging the flanged face of the member 18 to provide a friction clutch at 25. The cage 23 includes arms 26 between which balls 27 are disposed, these balls rolling on the surface of the race groove 16. Between the balls 27 are disposed a series of smaller balls 28 which are located by the larger balls, circumferentially, and which engage the surface of the stem 12. The balls 27 and 28 respectively are disposed in rows occupying planes of rotation which are axially spaced apart by an appropriate distance, the spacing being so designed that the balls 28 tend to wedge the balls 27 outwardly into engagement with the race groove 16, the balls 28 concurrently being urged into firm engagement with the stem 12. To hold the balls in these relationships, a loading plate 29 is provided in the form of an annulus coaxial with and embracing the stem 12, the plate 29 being spring pressed at 30 to urge the balls 28 in wedge-like fashion between the balls 27 and the stem 12. The plate 29 includes a hub 31 piloted on the stem 12 and piloted within the hub of the cage 23. The spring 30 bears at one end on the cage 23 and at its other end on the back of the loading plate 29. Rightward spring pressure, as shown, urges the balls 28 into the desired engagement while leftward spring reaction pressure acts on the cage 23 urging it into frictional driving engagement with the flanged member 18.

Assuming that the member 10 is the input member, the cage 23 the output member, and the race 15 a reaction member, rotation of the stem 12 will rotate the balls 28. Engagement of the balls 28 with the balls 27 will drive the latter balls while engagement of the balls 27 with the race groove 16 provides reaction since the race is non-rotatable. The balls 27 therefore will rotate the cage 23 at a reduced speed, this rotation being transmitted to the output shaft 9 through the clutch 25. By appropriate choice of the diameters of the stem 12 and the race groove 16, the reduction ratio of the mechanism is established, the diameters of the balls 27 and 28 being so chosen as to provide proper position relationships of the balls in the assembly. In the arrangement shown, the rotation ratio between the input member 10 and the output member 9 is approximately as twenty is to one. By changing the diameter of the stem 12 the ratio may be increased or decreased.

In single row ball speed changers of the prior art, the maximum ratio obtainable with a self-centering three-ball arrangement is about 12:1. For ratios greater than this, there is no room for the three balls in the assembly and the central driving stem would lose contact with the balls. In the present arrangement, using two rows of balls, ratios far in excess of 12:1 may be obtained with no difficulty.

This leads to an alternative embodiment of the invention shown in Fig. 3 wherein the stem 12a may be tapered longitudinally either in straight taper or convex or concave taper. The stem may also be constructed for axial translation to bring various diameters thereof under contact with the balls 28, thereby to change the drive ratio of the mechanism from the input to the output elements. A rather wide range of transmission ratios, having infinite steps of variation, may be obtained by such an alternative. An axial shifter 34 is shown for the tapered stem 12a, which stem may be driven by a rotating shaft 35. The loading plate 29a in this arrangement may be piloted in the cage 23 and is free of contact with the stem 12a so the latter may be adjusted in an axial direction.

While in the above description certain elements have been indicated as input, output and reaction members, it is clear that this relationship need not necessarily be used in applying the mechanism to specific purposes. For instance, the members 9 and 10 might each become input members whereupon the cage 15 will rotate (omitting the boss 20) at a speed which is a function of the difference between the speeds of the members 9 and 10. The mechanism may be used as a control differential by using the members 9 and 10 as input members and by limiting rotation of the cage 15 as by the boss 20. Electrical or other types of controls may be embodied to sense the direction of rotation urged by the input shafts on the cage 15 for the purpose of controlling auxiliary apparatus. Such an application is disclosed in the copending application of Edward K. Hine Serial No. 188,745, filed October 6, 1950.

Further variations in the mechanism may include the use of any one of the three movable elements as an input member, another of them as an output member and a third as a reaction member. Such modifications should be clear to those skilled in the art since the mechanism has the general characteristics of an epicyclic gear train comprising a sun gear, a ring gear and a planet pinion carrier disposed therebetween. In the arrangement shown, the spring urged pressure plate 29 holds the balls, stem 12 and cage 15 in driving relationship and the torque capacity of the mechanism may be altered by varying the amount of pressure exerted by the plate 29. If desired, the spring 30 may be replaced by equivalent loading systems such as pneumatic or hydraulic. Further, the pressure plate 29 may be carried on a thrust bearing so that it is free to rotate as it chooses during operation of the mechanism. As shown, the plate 29 rotates with the cage 23 through the spring 30 and this has been found satisfactory in a prototype mechanism since the balls 28 will roll and spin on the plate 29 while transmitting motion and torque without slippage from the stem 12 to the balls 27.

In designing a mechanism of the type herein disclosed, the solid geometry of the system must be carefully considered to the end that the balls 28, while engaging the plate 29 and the stem 12, will contact the balls 27 and will be located thereby in positions such that the balls are stable and under wedging action from the plate 29 to provide adequate driving contact pressure. The diameter of the stem 12 must be great enough to hold the balls 28 in slightly spaced relationship as can be visualized from Fig. 2.

This invention has an advantage in allowing for a very high reduction ratio; small diameter balls 28 may be used enabling the use of a very small driving stem, the small balls 28 then being surrounded by large balls 27 for engagement with the race 15. Thereby, a very wide range is possible in the ratio of diameters of the stem 12 to the race 15 enabling a wide range of reduction ratios. This would not be possible if only a single set of balls were used or if a conventional epicyclic gear train were used. Furthermore, the ratios of this mechanism are not limited by gear tooth relationships as would be the case in an epicyclic gear train.

If the stem 12, the race 15 and the pressure plate 29 are fabricated from hard wear resistant materials of the character of bearing ball material, the useful life of a mechanism of this type is very great and there will be little tendency for grooving or Brinelling of parts such as the stem 12 and the pressure plate 29.

Previously it was stated that the stem 12 may be tapered to provide a variable ratio drive. In addition to such a modification, the stem may have an enlarged diameter portion, tapered or straight, for direct engagement with the outer balls 27 to provide a low ratio drive in reverse sense from the drive afforded by both sets of balls. In such a modification, the stem 12 is arranged to relieve drive loading on the balls 28 when the stem contacts balls 27. By translating the stem 12, then, a high ratio or variable ratio drive may be provided, or a lower ratio drive with opposite rotation of the output member.

Though several embodiments illustrating the invention have been illustrated and described, it is to be understood that the invention may be applied in various forms. Changes may be made in the arrangements shown without departing from the spirit or scope of the invention as will be apparent to those skilled in the art and reference should be made to the appended claims for a definition of the limits of the invention.

What is claimed is:

1. A speed changer mechanism of ratio in excess of 12:1 comprising a spindle, a cup coaxial therewith, a coaxial cage between the cup and spindle, balls held by and rotatable with and with respect to said cage and rollably engaging the inner wall of said cup, additional smaller balls rollably engaging said first balls and said spindle and clear of cage contact, and axially loaded movable means on which said additional balls are rollable to hold them in engagement with said first balls and spindle, the ratio of inner cup diameter to spindle diameter being in excess of 12:1.

2. A speed changer mechanism of ratio in excess of 12:1 comprising a spindle, a cup coaxial therewith, a coaxial cage between the cup and spindle, balls held by and rotatable with and with respect to said cage and rollably engaging the inner wall of said cup, additional smaller balls rollably engaging said first balls and said spindle and clear of cage contact, and axially loaded movable means on which said additional balls are rollable to hold them in engagement with said first balls and spindle, said means including a resilient device yieldingly holding the recited elements in driving engagement with one another, the ratio of inner cup diameter to spindle diameter being in excess of 12:1.

3. A speed changer mechanism of ratio in excess of 12:1 comprising a spindle, a cup coaxial therewith, a coaxial cage between the cup and spindle, balls held by and rotatable with and with respect to said cage and rollably engaging the inner wall of said cup, additional smaller balls rollably engaging said first balls and said spindle and clear of cage contact, and axially loaded movable means on which said additional balls are rollable to hold them in engagement with said first balls and spindle, said first balls having their centers in a plane normal to the spindle axis, and said additional balls having their centers in a plane normal to the spindle axis but spaced from the first plane, the ratio of inner cup diameter to spindle diameter being in excess of 12:1.

4. A speed changer mechanism of ratio in excess of 12:1 comprising a spindle, a cup coaxial therewith, a coaxial cage between the cup and spindle, balls held by and rotatable with and with respect to said cage and rollably engaging the inner wall of said cup, additional smaller balls rollably engaging said first balls and said spindle and clear of cage contact, and axially loaded movable means on which said additional balls are rollable to hold them in engagement with said first balls and spindle, said means including a resilient device yieldingly holding the recited elements in driving engagement with one another, said first balls having their centers in a plane normal to the spindle axis, and said additional balls having their centers in a plane normal to the spindle axis but spaced from the first plane, the ratio of inner cup diameter to spindle diameter being in excess of 12:1.

5. A speed changer mechanism of ratio in excess of 12:1 comprising an outer race member, a coaxial inner race member, a plurality of coplanar balls, circumferentially spaced from one another, rollably engaging the outer race member, an equal plurality of coplanar smaller balls rollably engaging the inner race member, each of the inner balls rollably contacting two of the outer balls, and a cage for only one of the pluralities of balls, the ratio of outer race member diameter to inner race member diameter being in excess of 12:1.

6. A speed changer mechanism of ratio in excess of 12:1 comprising an outer race member, a coaxial inner race member, a plurality of coplanar balls, circumferentially spaced from one another, rollably engaging the outer race member, an equal plurality of coplanar smaller balls rollably engaging the inner race member, each of the inner balls rollably contacting two of the outer balls, a cage for only one of the pluralities of balls and elastic means to enforce engagement of the several balls and race members, the ratio of outer race member diameter to inner race member diameter being in excess of 12:1.

7. A speed changer mechanism of ratio in excess of 12:1 comprising an outer race member, a coaxial inner race member, a plurality of coplanar balls, circumferentially spaced from one another, rollably engaging the outer race member, an equal plurality of coplanar smaller balls rollably engaging the inner race member, each of the inner balls rollably contacting two of the outer balls, a cage for only one of the pluralities of balls and elastic means to enforce engagement of the several balls and race members, the planes of the two ball pluralities being axially spaced from one another and said elastic means having rolling engagement with one plurality of balls, the ratio of outer race member diameter to inner race member diameter being in excess of 12:1.

8. A speed changer mechanism of ratio in excess of 12:1 comprising an outer race member, a coaxial inner race member, a plurality of coplanar balls, circumferentially spaced from one another, rollably engaging the outer race member, an equal plurality of coplanar smaller balls rollably engaging the inner race member, each of the inner balls rollably contacting two of the outer balls, a cage for only one of the pluralities of balls and elastic means to enforce engagement of the several balls and race members, the planes of the two ball pluralities being axially spaced from one another and said elastic means having rolling engagement with one plurality of balls, said two members and said cage providing input, output and reaction members for said mechanism, the ratio of outer race member diameter to inner race member diameter being in excess of 12:1.

9. In a speed changer mechanism of ratio in excess of 12:1, an outer race member, a plurality of spaced balls constrained to rotate in a plane on said member, a cage coaxial with the member rollably engaging said balls, a second plurality of smaller balls between and within said first plurality rollably engaged with the balls of the first plurality and clear of engagement with said cage, rotatable with and with respect to the first balls, the second plurality being axially offset from the first plurality, and a central rotatable member, coaxial with the first member, drivably and rollably engaged by the balls of the second plurality, the ratio of race member diameter to central member diameter being in excess of 12:1.

10. In a speed changer mechanism of ratio in excess of 12:1, an outer race member, a plurality of spaced balls constrained to rotate in a plane on said member, a cage coaxial with the member rollably engaging said balls, a second plurality of smaller balls between and within said first plurality rollably engaged with the balls of the first plurality and clear of engagement with said cage, rotatable with and with respect to the first balls, the second plurality being axially offset from the first plurality, a central rotatable member, coaxial with the first member, drivably and rollably engaged by the balls of the second plurality, and elastic axially movable means to enforce driving rolling engagement of said balls and members, the ratio of race member diameter to central member diameter being in excess of 12:1.

11. In a speed changer mechanism of ratio in excess of 12:1, an outer race member, a plurality of spaced balls constrained to rotate in a plane on said member, a cage coaxial with the member rollably engaging said balls, a second plurality of smaller balls between and within said first plurality rollably engaged with the balls of the first plurality and clear of engagement with said cage, rotatable with and with respect to the first balls, the second plurality being axially offset from the first plurality, a central rotatable member, coaxial with the first member, drivably and rollably engaged by the balls of the second plurality, and a spring-pressed annulus rollably engaged with one plurality of balls urging the ball pluralities into firm driving engagement, the ratio of race member diameter to central member diameter being in excess of 12:1.

12. A differential speed changer mechanism of ratio in excess of 12:1 comprising a cylindrical driving stem, an annular reaction member surrounding the stem, one set of balls rollably engaging the stem, another set of smaller balls rollably engaging the member, the balls of the two sets rollably engaging only one another, a cage rollably engaging one set of balls and comprising a driven member, means to urge said balls of one set into firm driving engagement with balls of the other set and with said set, and means mounting said reaction member for limited oscillation about its axis.

13. A differential speed changer mechanism of ratio in excess of 12:1 comprising a cylindrical driving stem, an annular reaction member surrounding the stem, one set of balls rollably engaging the stem, another set of smaller balls rollably engaging the member, the balls of the two sets rollably engaging only one another, a cage engaging one set of balls and comprising a driven member, means to urge said balls of one set into firm driving engagement with balls of the other set and with said stem, means mounting said reaction member for limited oscillation about its axis, an output shaft and a slip clutch between said cage and output shaft.

14. In a speed changer mechanism, an outer race member, a plurality of spaced balls constrained to rotate in a plane on said member, a cage coaxial with the member engaging said balls, a second plurality of balls between and within said first plurality engaged with the balls of the first plurality, rotatable with and with respect to the first balls, the second plurality being axially offset from the first plurality, and a central rotatable member, coaxial with the first member, drivably engaged by the balls of the second plurality, said central member being tapered and translatable axially and of diameter relative to the outer race member diameter to provide variable drive ratio in said mechanism in excess of 12:1.

15. In a speed changer mechanism, an outer race member, a plurality of spaced balls constrained to rotate in a plane on said member, a cage coaxial with the member engaging said balls, a second plurality of balls between and within said first plurality engaged with the balls of the first plurality, rotatable with and with respect to the first balls, the second plurality being axially offset from the first plurality and a central rotatable member coaxial with the first member having varying diameter therealong, translatable axially to provide driving engagement of one plurality of said balls therewith at different diameter portions of the member, the larger diameter of said central member being not more than $\frac{1}{12}$ the diameter of said first member, providing a drive ratio of 12:1 and greater than 12:1 from said central member to said first member.

16. In a speed changer mechanism, an outer race member, a plurality of spaced balls constrained to rotate in a plane on said member, a cage coaxial with the member engaging said balls, a second plurality of balls between and within said first plurality engaged with the balls of the first plurality, rotatable with and with respect to the first balls, the second plurality being axially offset from the first plurality and a central rotatable member coaxial with the first member having varying diameter therealong, translatable axially to provide driving engagement of one plurality of said balls therewith at different diameter portions of the member, the larger diameter of said central member being not more than $\frac{1}{12}$ the diameter of said first member, providing a drive ratio of 12:1 and greater than 12:1 from said central member to said first member, means to translate said central member, and means to enforce driving engagement of the balls therewith.

17. A speed changer mechanism having a ratio in excess of 12:1 comprising a driving spindle, a first set of three balls arranged around and rollably engaging said spindle, the balls being closely spaced and in clearance relation with one another, a second set of three balls considerably larger than the first and disposed outwardly thereof, each of the balls of the second set contacting two of the balls of the first set, an outer race having a diameter in excess of twelve times the spindle diameter embracing the second set of balls and rollably engaged thereby, the planes of the centers of the two sets of balls being axially spaced, elastic means urging the first set of balls toward the plane of the second set of balls, and a cage for only one of said ball sets engageable with the balls thereof in driving relationship.

18. A speed changer according to claim 17 wherein the driving spindle is cylindrical.

19. A speed changer according to claim 17 wherein the driving spindle is tapered and axially translatable.

References Cited in the file of this patent

UNITED STATES PATENTS

| | | |
|---|---|---|
| 1,399,443 | Rennerfelt | Dec. 6, 1921 |
| 1,628,769 | Farmer | May 17, 1927 |
| 1,701,723 | Lyons | Feb. 12, 1929 |
| 1,976,407 | Morgan | Oct. 9, 1934 |
| 2,051,842 | Goldberg | Aug. 25, 1936 |

FOREIGN PATENTS

| | | |
|---|---|---|
| 650,288 | France | Jan. 7, 1929 |
| 60,374 | Denmark | Nov. 16, 1942 |